United States Patent
Kossel

(10) Patent No.: US 9,928,035 B2
(45) Date of Patent: Mar. 27, 2018

(54) MULTIPLY-AND-ACCUMULATE UNIT IN CARRY-SAVE ADDER FORMAT AND APPLICATION IN A FEEDBACK LOOP EQUALIZER

(71) Applicant: INTERNATIONAL BUSINESS MACHINES CORPORATION, Armonk, NY (US)

(72) Inventor: Marcel Kossel, Reichenburg (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2 days.

(21) Appl. No.: 15/157,545

(22) Filed: May 18, 2016

(65) Prior Publication Data

US 2016/0342393 A1 Nov. 24, 2016

(30) Foreign Application Priority Data

May 20, 2015 (GB) .................................. 1508635.8

(51) Int. Cl.
- *G06F 7/38* (2006.01)
- *G06F 7/53* (2006.01)
- *G06F 7/57* (2006.01)
- *G06F 7/544* (2006.01)

(52) U.S. Cl.
CPC .......... *G06F 7/5312* (2013.01); *G06F 7/5443* (2013.01); *G06F 7/57* (2013.01)

(58) Field of Classification Search
CPC ......... G06F 7/5312; G06F 7/5443; G06F 7/57
USPC .................................. 708/523, 620–632, 708
See application file for complete search history.

(56) References Cited

U.S. PATENT DOCUMENTS

| | | | | |
|---|---|---|---|---|
| 5,241,493 A | * | 8/1993 | Chu | G06F 7/5443 708/501 |
| 5,847,981 A | * | 12/1998 | Kelley | G06F 7/5443 708/523 |
| 8,019,805 B1 | | 9/2011 | Sarma | |
| 8,275,822 B2 | | 9/2012 | Olofsson et al. | |
| 8,307,023 B1 | | 11/2012 | Leung et al. | |
| 8,645,450 B1 | | 2/2014 | Choe et al. | |
| 2014/0188968 A1 | | 7/2014 | Kaul et al. | |

OTHER PUBLICATIONS

Setia et al., High Speed Parallel Multiplier-Accumulator (MAC)—A Review, International Journal of Application or Innovation in Engineering & Management, Feb. 2013, vol. 2, Issue 2.

(Continued)

*Primary Examiner* — Tan V. Mai
(74) *Attorney, Agent, or Firm* — Rabin Bhattacharya

(57) ABSTRACT

A multiply and accumulation (MAC) unit for multiplying a provided first and a provided second multiplicand and for adding a provided summand to the resulting product is described. The MAC includes at least one multiplication block which is configured to multiply a first input signal and a second input signal, wherein the first input signal is given in a carry-save adder format and the second input signal is given in a binary format, wherein the multiplication result is provided in a carry-save format, and a carry-save adder which is configured to add to the result of the multiplication the provided summand.

12 Claims, 5 Drawing Sheets

(56) References Cited

OTHER PUBLICATIONS

Setia et al., Novel Architecture of High Speed Parallel Mac Using Carry Select Adder, International Journal of Computer Applications, Jul. 2013, vol. 74, No. 1.
Rajput et al., High Speed Modified Booth Encoder Multiplier for Signed and Unsigned Numbers, 14th International Conference on Computer Modeling and Simulation, Mar. 28-30, 2012.

* cited by examiner

MULTIPLY-AND-ACCUMULATE UNIT IN CARRY-SAVE ADDER FORMAT AND APPLICATION IN A FEEDBACK LOOP EQUALIZER

CROSS-REFERENCE TO RELATED ART

This application claims priority under 35 U.S.C. § 119 from United Kingdom Patent Application No. 1508635.8 filed May 20, 2015, the contents of which are incorporated herein by reference.

BACKGROUND

The present invention relates to multiply-and-accumulate (MAC) units including operations in carry-save adder (CSA) data format which is referred below as CSA-MAC. Furthermore, the present invention relates to the application of CSA-MAC units to feedback loop equalizers such as for instance Tomlinson-Harashima precoders.

MAC units are well known in the art. Conventional MAC units have three inputs, namely two multiplicands and one summand, each of which is in a binary form, such as a little endian format. The MAC operation includes a multiplication of the two multiplicands and an adding operation of the resulting product and the summand. The output of the MAC operation conventionally is in a binary or CSA format. The carry-save adder format is a number format where a sum and a carry portion is separately provided wherein a final operation to combine the sum portion and the carry portion to a standard binary format such as a little endian format is omitted. Because the CSA format avoids the carry rippling, it belongs to one of the fastest data formats for summation operations.

In general, MAC operations are the most basic operation type in every digital computing device so that there are many approaches to speed up the MAC operation. For instance, if such a MAC unit is employed in a loop, the overall cycle time is essentially affected by the propagation delays of its suboperations such as the multiplication and addition. As MAC units are often used in feedback loops in the digital implementation of high speed 10 equalizers such as decision feedback equalizers in receiving interfaces, Tomlinson-Harashima precoder devices in transmitting interfaces, IIR filters and the like, speeding up the MAC operation can generally lead to higher bandwidths in signal transmission.

Document U.S. Pat. No. 8,275,822 B2 discloses a digital signal processor with a multiplication engine including a first partial product generation circuit to generate a first set of unequally weighted partial products from a set of input operands; a second partial product generation circuit to generate a second set of equally weighted partial products from the set of input operands; a multiplexer to select the first set of unequally weighted partial products or the second set of equally weighted partial products in accordance with first and second multiplier modes, respectively; and a carry-save adder array configured to add the selected set of partial products, wherein, in the first multiplier mode, the carry-save adder array folds over higher-order bits of the first set of unequally weighted partial products into lower-order slots in the carry-save adder array, thereby allowing the same carry-save adder array to be used in either the first or the second multiplier modes.

Document U.S. Pat. No. 8,090,013 B2 discloses a Tomlinson-Harashima precoder with the number of stages, each stage including a multiplier, an adder, a register and a modulo operator which are subsequently coupled so that the outputs of the modulo operators are coupled with an input of the adder of the next stage. The outputs of the adders are connected with the modulo operator, and the output of the last modulo operators in the line of stage is fed back to the inputs of each of the multipliers.

SUMMARY

According to a first aspect a multiply and accumulation (MAC) unit for multiplying a provided first and a provided second multiplicand and for adding a provided summand to the resulting product is provided, including: at least one multiplication block which is configured to multiply the first multiplicand and the second multiplicand, wherein the first multiplicand is given in a carry-save adder format, wherein the multiplication result is provided in a carry-save format; and a carry-save adder which is configured to add the result of the multiplication to the provided summand.

According to another aspect, a Tomlinson-Harashima precoder is provided, including: a number of above MAC units, wherein multiple multiplication blocks are provided each having a first multiplicand input and a second multiplicand input, wherein the outputs of each of the multiplication blocks one of are connected directly and are connected via a respective 2s complement inversion block to a multiplexer, wherein an output of the multiplexer is connected to the carry-save adder, wherein the MAC units are interconnected in a pipelined stage configuration such that their latched outputs become the summand input for the CSA-MAC unit of a next pipelining stage; and at least one adding unit for receiving an output of the CSA-MAC unit of the last pipelining stage and for adding a predetermined value wherein the output of the CSA-MAC unit of the last pipelining stage and the output(s) of the at least one adding unit are coupled with a respective one of the first multiplicand inputs of at least a part of CSA-MAC unit in the pipelined feedback loop.

BRIEF DESCRIPTION OF THE SEVERAL VIEWS OF THE DRAWINGS

Embodiments are described in more detail in conjunction with the accompanying drawings in which.

DETAILED DESCRIPTION

In certain applications, a conventional multiply-and-accumulate unit (MAC unit) needs to process operands which in conventional MAC units are supplied as binary values. These operands sometimes need to be converted from a CSA format provided by a previous stage into the required binary format. The conversion of a result of a carry-save adder to a binary format is usually carried out by a carry propagation adder that involves a successive carry rippling which has a significant impact on the propagation delay of the summation operation.

For situations, where one of the multiplicands corresponds to a value which needs to be converted from the CSA format provided by a previous stage, it is herein proposed to provide an adapted CSA MAC unit which allows that one of the multiplicands is provided in CSA format so that the result of the previous stage given in CSA format does not need to be converted to binary format before being applied to the CSA MAC unit.

Figure 1:
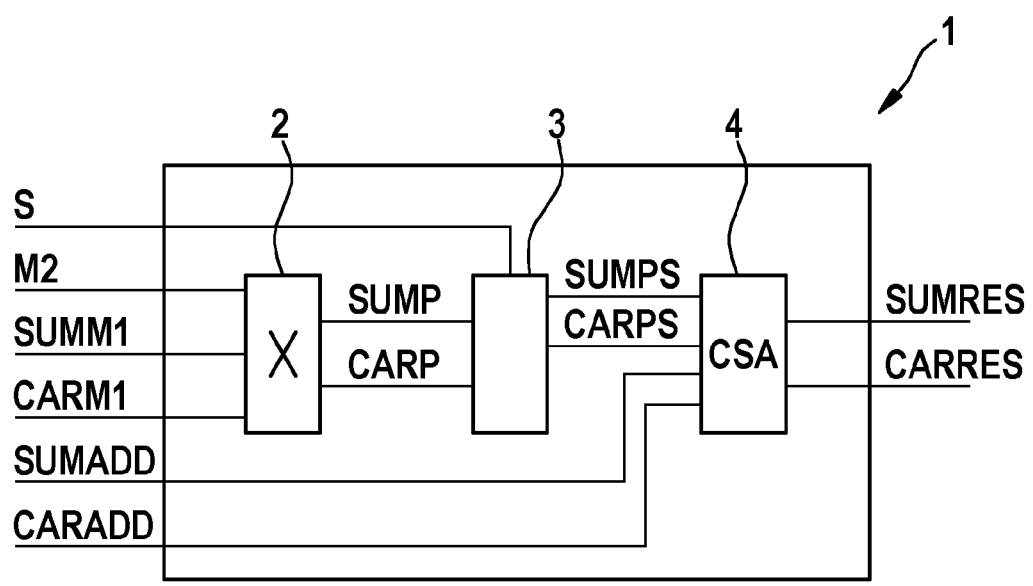
FIG. 1 shows a block diagram of a MAC unit.

FIG. 1 schematically shows a block diagram of a CSA MAC unit 1 having a carry-save multiplication block 2, a 2s complement inversion block 3 and a carry-save adder block 4. The carry-save multiplier block 2 receives as input signals a first multiplicand M1 in the CSA format, such as a sum portion SUMM1 of the first multiplicand and a carry portion CARM1 of the first multiplicand is provided. Furthermore, the carry-save multiplier block 2 receives a second multiplicand M2 in a binary format such as a little endian or big endian format. The carry-save multiplier block 2 outputs a corresponding multiplication result in CSA format with a sum portion SUMP and a carry portion CARP of the multiplication result.

The multiplication result SUMP, CARP is applied to the 2s complement inversion block 3 which also receives a sign bit S as an input of the CSA MAC unit. The sign bit S indicates the sign of the second multiplicand M2. In case the sign bit S indicates a positive value of the second multiplicand M2, the 2s complement inversion block 3 simply forwards the multiplication output SUMP, CARP in the CSA format to the output of the 2s complement inversion block 3 in the CSA format as SUMPS, CARPS. If the sign bit S indicates a negative second multiplicand M2, the 2s complement inversion operation is applied on the multiplication output in the CSA format to obtain the output of the 2s complement inversion block 3 in the CSA format as SUMPS, CARPS. The 2s complement inversion is applied to both the sum portion SUMP and the carry portion CARP of the multiplication output.

The 2s complement inversion block output SUMPS, CARPS in the CSA format is fed to the input of a carry-save adder block 4 together with a summand ADD applied at the input of the CSA MAC unit 1. The summand ADD can be provided in a binary format or in a CSA format. In case the summand ADD is provided in a binary format, the carry-save adder block 4 can be configured as a single carry-save adder with a 3:2 compression so that the adder results SUMRES, CARRES are provided in the CSA format. In case the summand ADD is provided in a CSA format the carry-save adder block 4 can be configured as a multiple stage carry-save adder or a carry-save adder with a 4:2 compression so that the adder results SUMRES, CARRES are provided as well in the CSA format.

Figure 2:
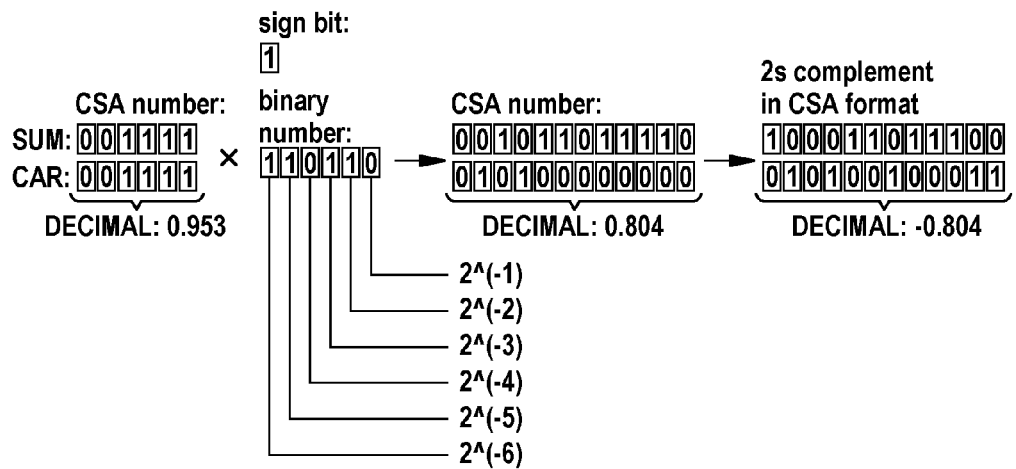
FIG. 2 illustrates a sample operation in the CSA multiplier block of the MAC unit.
Figure 2:
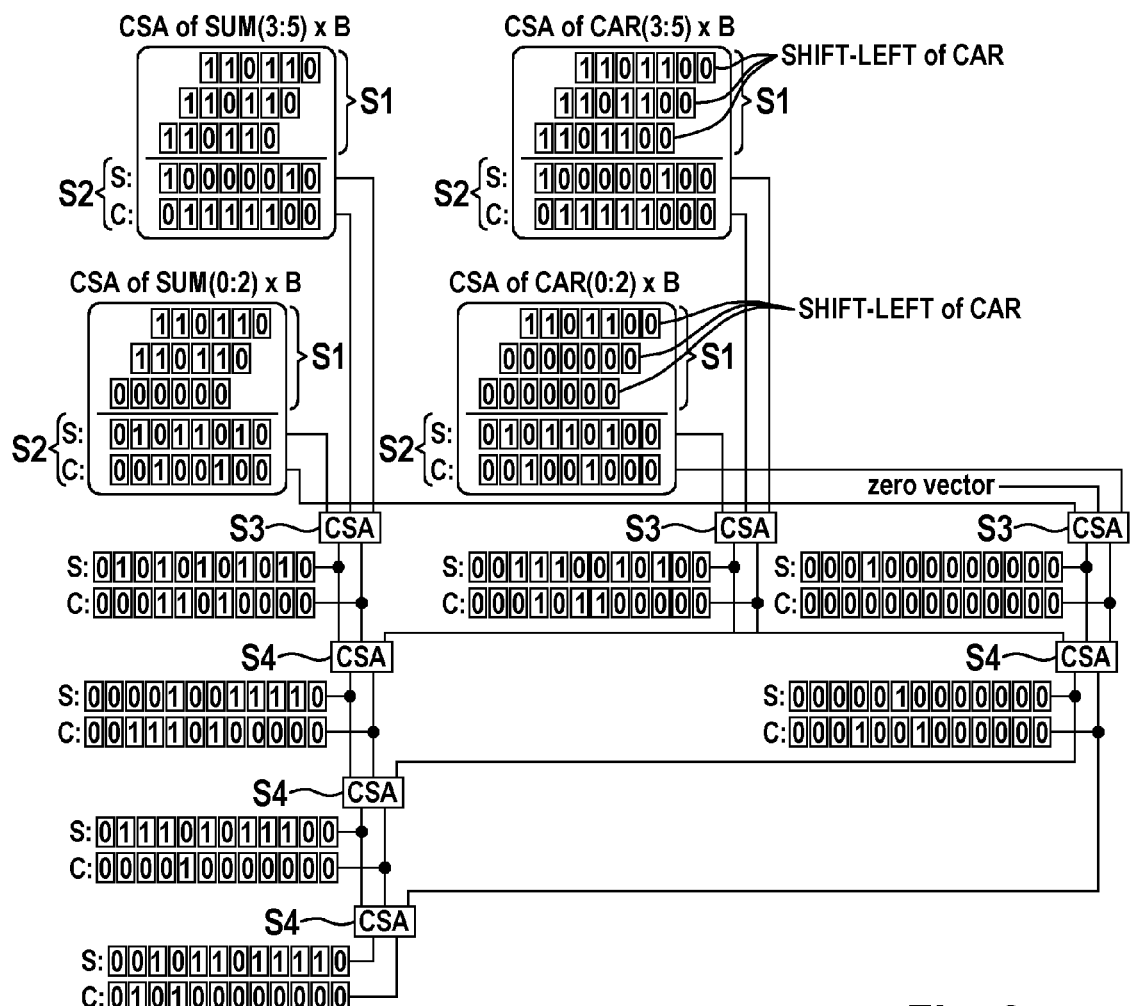
Figure 3:
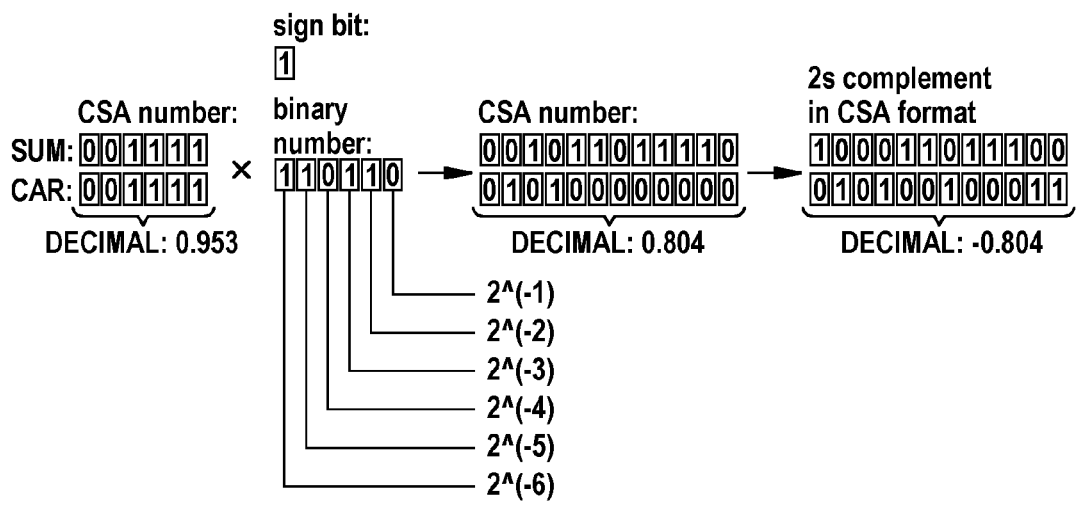
FIG. 3 shows a sample operation of a 2s complement inversion operation in CSA format.

The CSA multiplication performed in the multiplication block 2 is exemplarily described in conjunction with the example of FIG. 2. Substantially, the multiplication of the first multiplicand M1 in the CSA format and the second multiplicand M2 in the binary format is performed by a conventional multiplication of the first multiplicand M1 in CSA format (SUMM1, CARM1) given as SUMM1+2×CARM1 with a binary second multiplicand M2 that has a separate sign bit S. The bit order preferably is little endian. In the CSA multiplication, the operations can be performed in blocks of n bits (in the present embodiment of n=3 bits) so that first the n least significant bits of the sum portion SUMM1 [3:5] of the first multiplicand M1 are each multiplied with the second multiplicand M2 having m bits (m=6 in the present embodiment) in step S1. The same operations are performed e.g. in parallel with the remaining sets of n bits of the sum portion SUMM1 and carry portion CARM1 of the original first multiplicand M1 in CSA format. In the present case, where the sum portion and the carry portion of the first multiplicand M1 and the second multiplicand M2 each have 6 bits, a total of 4 parallel 3 bit×6 bit multiplications are carried out.

The multiplications are carried out according to the CSA format, which means that the sum-vector is directly applied (e.g., SUM1×M2) whereas the carry-vector is first multiplied by 2, which means 1-b-left shifted for little endian format (e.g., 2×CARM1×M2). A partitioning of 3 bits for the M1 multiplications has been chosen here as this results in 3 partial products which can then be summed up with a 3:2 compression adder (i.e., conventional CSA adder). If another compression adder type such as for instance a 4:2 compression adder is chosen for the summation of the partial products, the partitioning of M1 must be changed to different sets of bit widths in which the sets can have the same of different lengths (e.g., 4 bits and 2 bits for a total width of 6 bits). The optimization goal to choose the appropriate partitioning of the multiplicand and the successive addition with a compression adder as well as the final summation of the partial products in an adder tree, is given by the minimization of the total adder tree depth under the consideration that higher order suppression adders (e.g. 4:2 compression adders) can internally also have smaller adder trees. The smaller the adder tree depth, the smaller the overall latency of the MAC operation and also the smaller the power consumption because of the reduced arithmetic rippling within the adder tree.

The n bit×m bit multiplications are summed up in a CSA adder tree, according to steps S2-S4. In the example the CSA adder tree is implemented by using 3:2 compression adders that have two sum-vector inputs and one carry-vector input and give the result again in CSA format with one sum vector and one carry vector. If the tree is not fully populated with respect to the inputs of the individual 3:2 compression adders, an all-zero vector can be applied to the pertinent input (an example is shown at the far right adder at step 3). The CSA adder tree finally outputs the sum and hence the MAC operation output in CSA format.

In step S4, further stages of carry-save adding operations follow until only a single multiplication result in CSA format is left.

Substantially, the multiplication block 2 performs a calculation SUMM1×M2+2×CARM1×M2=SUMP, CARP as the multiplication output in the CSA format. The way of calculation as outlined in FIG. 2 is only exemplary, and there are other methods to perform the multiplication operation in the multiplication block 2 using multiplication operation and carry-save adding as already mentioned above.

Once the multiplication output SUMP, CARP has been obtained in the CSA format, the sign bit S of the second multiplicand M2 is taken into account in the 2s complement inversion block 3. If the sign bit S indicates that no sign inversion shall be carried out, the 2s complement inversion of the multiplication output SUMP, CARP in CSA format is not carried out. In case the sign bit S indicates a negative second multiplicand M2, the 2s complement output PS is calculated by INV (SUMP)+INV (2×CARP)+0×10 using a carry-save adding operation with a 3:2 compression to obtain the negated value of the multiplication output in a CSA format.

In the final carry-save adder block 4, a carry-save adding operation is performed to add the 2s complement output SUMPS, CARPS and the summand SUMADD, CARADD provided at the input of the CSA MAC unit 1 to obtain an MAC output in the CSA format.

The proposed CSA MAC unit 1 does not include any carry-rippling operation in a carry propagation adder or the like so that the propagation delay of such a MAC unit is greatly reduced. So the MAC unit 1 can be used to perform computation in timing critical loops while all computations are made in the CSA format. Once the data leaves the loop, the MAC results can be converted to a binary format if necessary.

Essentially, the computation time-consuming conversion from the CSA format to binary format is eliminated from the operation in the MAC unit 1 so that the application of the MAC unit in a loop can have a substantial impact on the overall timing. The speed advantage is achieved by keeping the timing critical loop in a pure CSA format so as to avoid any carry rippling.

One exemplary application of such a CSA MAC unit 1 is in a Tomlinson-Harashima precoder. In general, a Tomlinson-Harashima precoder is applied in a transmitting interface belonging to asymmetric links where the equalization complexity can only be placed in the transmitter. An example is for instance given by DSL modems or some Gigabit ETHERNET implementations. Also memory interfaces are asymmetric links where Tomlinson-Harashima precoding might be a candidate to increase the data rate of future memory systems.

Substantially, the Tomlinson-Harashima precoder employs a multiplication and summation tree, the output of which is fed back. Substantially, the Tomlinson-Harashima precoder has a number N of (preferably pipelined) MAC units wherein the outputs of the $1^{st}$ to $(N-1)^{th}$ MAC units are provided as summands for the respective next MAC unit. At the summand input of the $1^{st}$ MAC unit, the input signal is applied, while the MAC output of the $N^{th}$ MAC unit is applied to a modulo block, the modulo output of which is fed back to the first multiplicand inputs of the pipelined MAC units. The second multiplicand input serves to receive a respective post cursor coefficient which is provided as is known in the art. A further description of operation and configuration of a Tomlinson-Harashima precoder is described in document M. Kossel, T. Toifl et al., "A 10 Gb/s 8-Tap 6b 2-PAM/4-PAM Tomlinson-Harashima Precoding Transmitter for Future Memory-Link Applications in 22-nm SOI CMOS," IEEE J. Solid-State Circuits, vol. 46, no. 12, pp. 3268-3284, December 2013 which is hereby included by reference.

To improve the loop delay in a Tomlinson-Harashima precoder, it is proposed that the modulo operation whose computation requires ripple-carry additions is removed from the timing critical feedback loop and arranged outside of the loop so that the modulo operation is performed in parallel to the MAC operation within the feedback loop.

Figure 4:
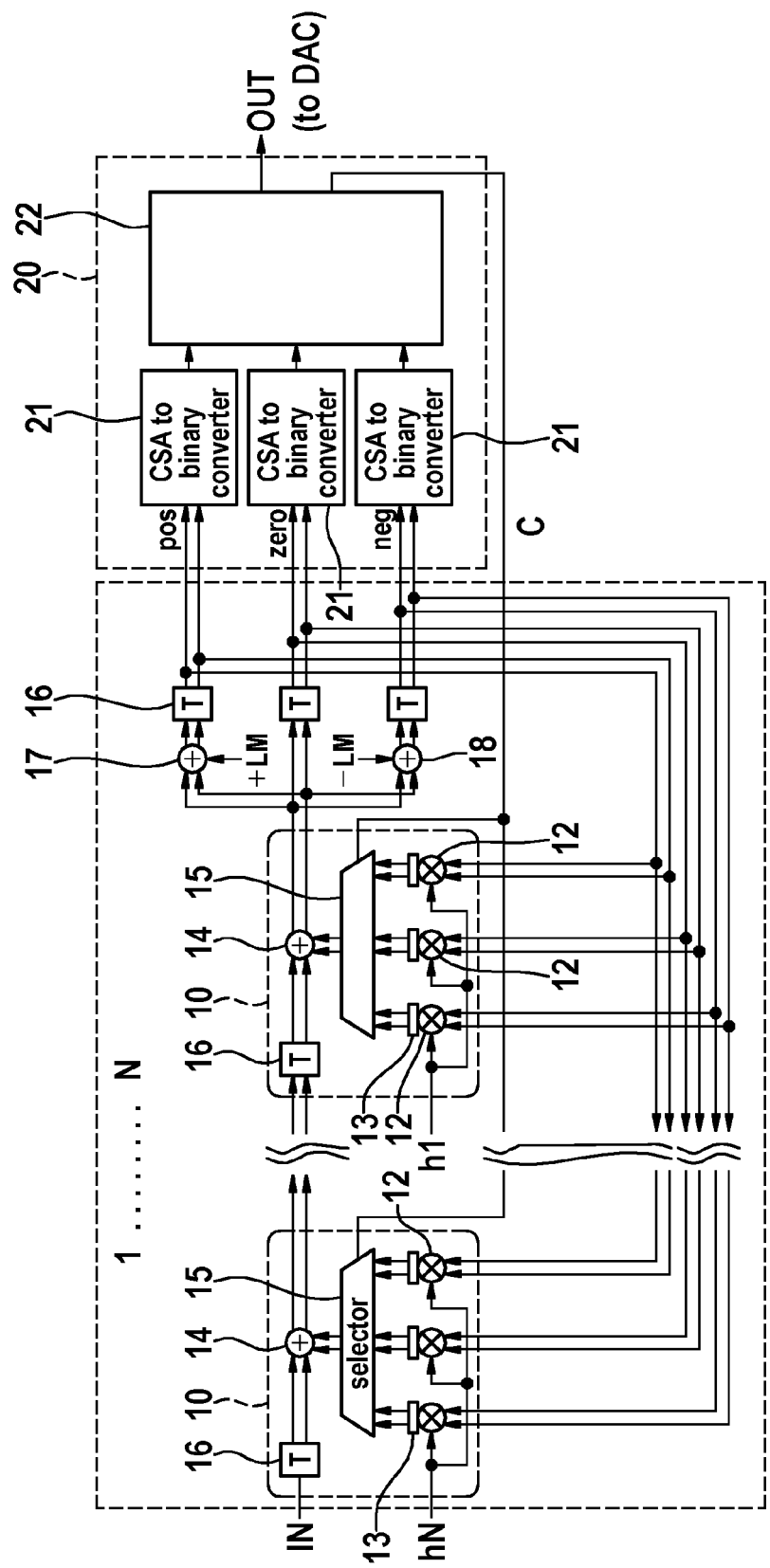
FIG. 4 shows a block diagram of a Tomlinson-Harashima precoder with modulo speculation.

FIG. 4 shows a block diagram of a modified Tomlinson-Harashima precoder in which the modulo operation is performed in parallel with the MAC operation, and hence the computation of time-consuming rippling of the carry is performed outside of the timing critical feedback loop. The removal of the modulo operation from the feedback loop to the output is made possible by the application of the modified CSA MAC units 10 which can be used since their first multiplicand inputs, their summand inputs as well as their outputs are provided in the CSA format which avoids carry bit rippling and hence makes it the fastest data format available for MAC topologies.

The Tomlinson-Harashima precoder of FIG. 4 employs modified MAC units 10 each of which is substantially similar to the CSA MAC unit 1 as described before. The MAC units 10 are subsequently coupled by means of a respective latch 16, so that an output of a MAC unit 10 of a previous stage is coupled via the latch 16 to the summand input of the MAC unit 10 of a subsequent stage, to allow synchronization.

The modified MAC unit 10 has multiple multiplication blocks 12 followed by 2s complement inversion blocks 13, a multiplexer 15 and a carry-save adder block 14. The 2s complement inversion blocks 13 can be provided upstream or downstream the multiplexer 15. Multiple multiplication blocks 12 are provided in the modified MAC unit 10 so that a parallel multiplication operation can be performed. The multiplication operations serve to multiply a respective first multiplicand and a second multiplicand with corresponds to a given identical post cursor coefficient. For the multiplication blocks 12 of each of the modified CSA MAC units 10, the first multiplicand of a first multiplication of the multiplication operations corresponds to the output of a $1^{st}$ speculative CSA adder 17 that adds the constant term +LM to the output of the Nth CSA MAC unit 10, and analogously the first multiplicand of a second multiplication directly corresponds to the output of the Nth CSA MAC unit 10 without any speculative addition and finally the first multiplicand of a third multiplication corresponds to the output of a $2^{nd}$ speculative CSA adder 18 that adds the constant −LM to the output of the Nth CSA MAC unit 10. The additions are speculative because they are carried out during the period of time in which the operation of the CSA-to-binary converters 21—each of which is basically a ripple-carry addition with successive inspection of the result's sign and MSB bits to determine whether a modulo operation has occurred—are still running and hence the correct value is not known yet.

Only one out of the three multiplicands that are fed back to the CSA MAC units in the loop can be valid. The correct value is only known once the CSA-to-binary conversions have been completed and the sign and MSB bits of their results have been evaluated. If the sign bit in the result of the CSA-to-binary conversion is asserted, an invalid negative modulo jump has occurred (indirectly triggered by the addition of −LM). If the MSB is asserted, an invalid positive modulo jump has occurred (indirectly triggered by the addition of +LM). The valid multiplicand is defined as the one whose CSA-to-binary conversion has no sign or MSB bit asserted because then the result is within the valid transmit range, which is equivalent to the result that can be obtained if a real modulo operation were applied to the output of the Nth CSA MAC unit 10.

The term LM defines the transmit range, which is equivalent to the size of a modulo jump (e.g., mod(CSA MAC unit output, LM)). For instance, if the Nth CSA MAC unit output is 0.567 and LM is 1, the middle path, where no speculative addition is applied, becomes valid since the other paths would result in 1.567 (MSB is asserted) or −0.433 (sign bit is asserted), respectively. In this example no modulo correction must be applied. However, if e.g. the output of the Nth CSA MAC unit 10 is 1.23, the speculative path with the addition of −LM (=1) becomes valid as the resulting sum is 0.23, which is within the valid transmit range of {0,1} whereas the other paths produce 1.23 (direct path, MSB is asserted) and 2.23 (path with +LM speculation, MSB is asserted), respectively. Analogously for an exemplary output of an Nth CSA MAC unit of −0.78 where the +LM speculation yields the correct multiplicand of +0.22 and the other paths produce wrong results (−1.78 for −LM and −0.78 in the direct path).

Only two speculation levels, −LM and +LM, respectively, are used here because for most wireline channels with moderate post-cursor intersymbol-interference (ISI) and moderate PAM order (e.g., <8-PAM) no more than one modulo level (positive or negative if the data signal is polar and not unipolar) might occur. For higher order modulo levels (e.g., double, triple jumps) more speculative levels (e.g., −2×LM, −1×LM, +1×LM, +2×LM) must be introduced and evaluated.

The occurrence of modulo jumps can be determined when comparing $\gamma=1/\Sigma(|h_{inv}(k)|)$ to the swing scaling loss of Tomlinson-Harashima precoding, where $\Sigma|\eta_{inv}(k)|$ is the sum of the absolute terms of the sampled inverted pulse response of the channel. If the swing scaling loss that needs to be applied to the data signal in a Tomlinson-Harashima precoder prior to the post-cursor ISI removal in the IIR filter with modulo operation is defined as $\eta=(L-1)/L$ with L denoting the number of PAM symbol levels, modulo jumps will occur when $\gamma<\eta$. For 2-PAM $\eta$ is 0.5, for 4-PAM $\eta$ is 0.75 (i.e., $\eta=(4-1)/4$). In general the swing scaling factor describes the reduction of the available transmit swing by half a symbol spacing M/2 on each side to ensure that the symbol spacing remains equidistant even at the occurrence of modulo jumps in the received signal after the channel. The occurrence of modulo jumps is hence a function of post-cursor ISI and PAM order and the amount of modulo speculation needs to be chosen in accordance to the probability of triggering modulo jumps given by $\gamma$ and $\eta$.

In the first adder block 11 to the output of the Nth modified MAC unit 10, a predetermined positive offset +LM is added while in the second adder block 12 to the output of the modified MAC unit a negative offset −LM is added. The product LM denotes the signal swing, where L is the number of symbols and M is the normalized symbol spacing. For instance, for 4-PAM L=4 (Symbols '00' '01' '10' '11' while M=0.25 is the symbol spacing, if the maximum swing is normalized. Each of the outputs of the first adder block 11, the output of the second adder block 12 and the output of the Nth modified MAC unit 10 are applied on a modulo speculation unit 20.

The modulo speculation unit 20 includes one CSA-to-binary converters 21 for each of the output of the first adder block 11, the output of the second adder block 12 and the output of the Nth modified MAC unit 10. The CSA-to-binary converters 21 can be a ripple-carry adder, such as a carry propagation adder. The output of each of the CSA-to-binary converters 21 are provided to a selector unit 22 which is configured to determine which of the outputs of the CSA-to-binary converters 21 does not generate an overflow or underflow and hence determines which speculation path is the valid one and can be used to control the multiplexer 15.

The valid path can be selected by a control signal C that is provided by the modulo speculation unit 20 to the selection input of the multiplexer 15 in each of the individual modified CSA MAC blocks 10 in the feedback loop.

In the multiplication blocks 12, a multiplication with a second multiplicand being a post-cursor coefficient is performed, and the outputs of the multiplication blocks 12 are applied to the 2s complement inverter blocks 13 whose outputs are applied to the multiplexer 15.

In a conventional feedback loop of a pipelined, full-rate Tomlinson-Harashima precoder the feedback loop delay is $T_f=T_m+T_a$, wherein $T_m$ denotes the computational time for the multiplication in the multiplication block 12 and $T_a$ the adder delay of the CSA-to-binary converter 21. As the multiplication operation and the ripple carry addition of the CSA-to-binary converter 21 are now performed in parallel, the Tomlinson-Harashima feedback loop based on the modified CSA MAC units 10 in combination with displacing the ripple-carry addition of the CSA-to-binary converters 21 downstream to the output of the feedback loop reduces the loop delay to $T_f=\max\{T_m|T_a\}$. Therefore, this parallel computation significantly reduces the feedback loop delay and hence increases the data rate. The data rate is proportional to $1/T_f$.

Figure 5:
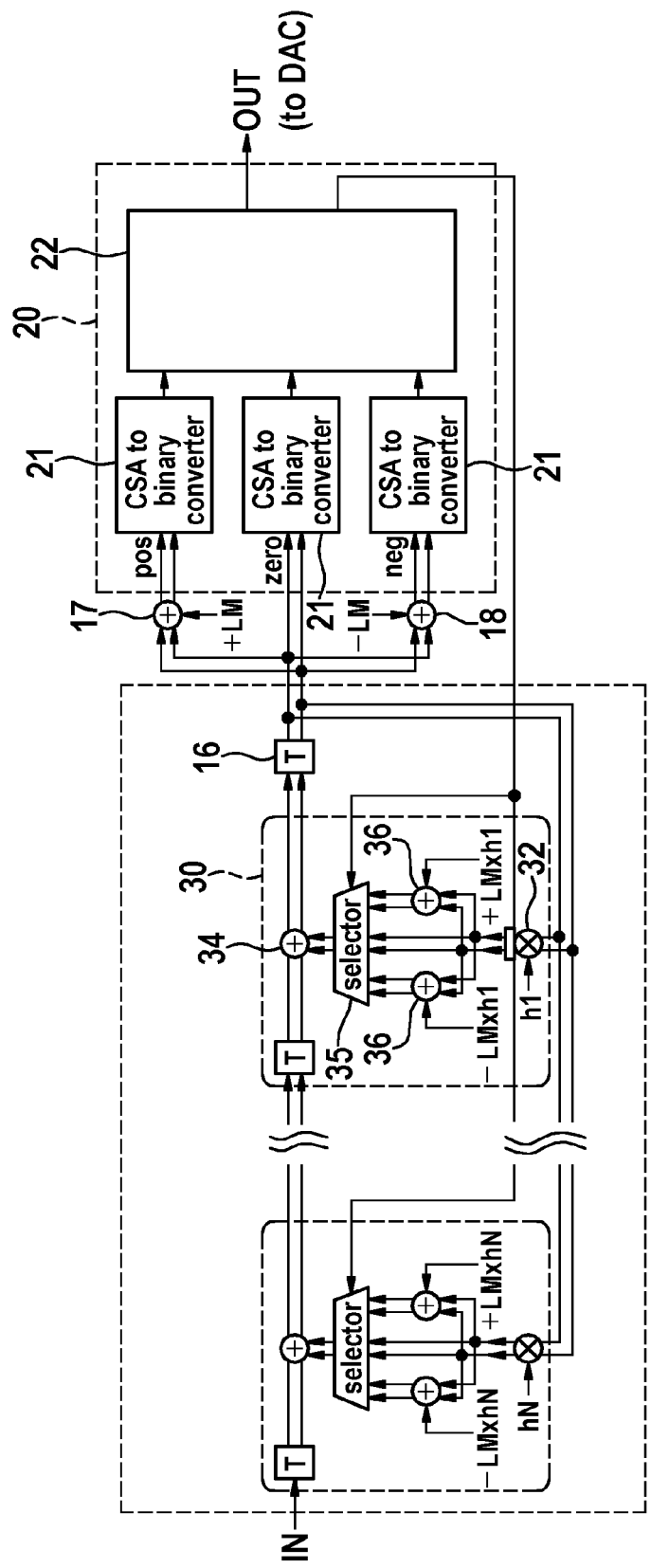
FIG. 5 shows a block diagram of a further Tomlinson-Harashima precoder with modulo speculation where the number of multiplication units required to perform the modulo speculation is minimized.

The embodiment of FIG. 5 shows a further implementation of the Tomlinson-Harashima precoder with further modified CSA MAC units 30. In the modified CSA MAC unit 30 a single multiplication block 32 is provided and hence the hardware complexity e.g. in terms of multiplier units is reduced at the cost of a slightly increased propagation delay time. The input of the multiplication block 32 is connected with the output of the Nth modified CSA MAC unit 30. The output of the multiplication block 32 is connected via the 2s complement inversion block 33 directly to a multiplexer 35 and to two additional adder elements 36 needed to add and subtract +LM*hN and −LM*hN, respectively, where hN is the n-th post-cursor tap weight. The outputs of the two additional CSA elements 16 are fed to inputs of the multiplexer 35.

In this version, the output of the Nth modified CSA MAC unit 30 is fed back to the first multiplicand input of the modified MAC units 30 while the outputs of the 2s complement inversion block are applied on the input of a first of the additional adder elements 36 for adding −LM×hN, i.e. the negative product of the predetermined value of LM multiplied with the respective post-cursor coefficient h1 . . . hN and to a second of the additional adder elements 36 to add +LM×h1, i.e. the positive product of the predetermined value of LM and the post-cursor coefficient. The outputs of the first and second additional adder elements 36 and the outputs of the 2s complement inversion blocks are provided to the multiplexer 35 which is selected by the control signal C of the modulo speculation unit 20 as described before.

It is noted that the embodiments of FIG. 4 and FIG. 5 show full-rate implementations of the Tomlinson-Harashima precoder. The same operation principle of keeping the feedback loop in a pure CSA format with pertinent CSA-MAC units while simultaneously performing the modulo speculation outside the loop via CSA-to-binary converters (i.e., a ripple carry adder) can also be applied to subrate implementations of Tomlinson-Harashima precoders where for instance a pipelined, half-rate Tomlinson-Harashima precoder implementation (but without the application of a CSA-MAC and the simultaneous modulo speculation outside the loop) is given according to M. Kossel, T. Toifl et al., "A 10 Gb/s 8-Tap 6b 2-PAM/4-PAM Tomlinson-Harashima Precoding Transmitter for Future Memory-Link Applications in 22-nm SOI CMOS," IEEE J. Solid-State Circuits, vol. 46, no. 12, pp. 3268-3284, December 2013 which is hereby included by reference.

One of the ideas of the above MAC unit is that the multiplication block is configured to multiply two multiplicands, a first multiplicand being provided in a carry-save adder format (CSA format) having a sum portion and at least one carry portion and the second multiplicand being provided in a standard binary format such as a little or a big endian format. The output of the multiplier block is also in the CSA format.

In a subsequent carry-save adder block, a summand in the carry-save adder format is added to the multiplication output in the carry-save adder format to obtain an output of the MAC unit in a carry-save adder format.

While in conventional MAC units the output of the carry-save adder is converted by a carry propagation adder to a binary format, the result of the MAC unit here is provided in the CSA format so that a carry rippling operation of the carry propagation adder is avoided. The possibility to perform the multiplication of the first multiplicand in a carry-save adder format allows to include the MAC unit in a feedback loop wherein the output of one of the MAC units in the carry-save adder format is directly coupled as a first multiplicand to the same or another MAC unit or is coupled by means of an operation which does not change the carry-save adder format of the first multiplicand. Therefore, the output of the MAC unit can be applied with a further carry-save adder operation, as their output corresponds to the carry-save adder format as well.

One idea is to implement the MAC operation in a carry-save format, which results in a propagation delay reduction and thus increases the speed of digital IOs as it does not contain any carry rippling and purely relies on the carry-save adder format for all processing steps. If the result of the MAC operation needs to be in a binary format, the conversion from the CSA format to the binary format can be performed external to the critical path.

Furthermore, the at least one multiplication block can be configured to perform a multiplication with the second multiplicand given in a binary format.

According to an embodiment, the carry-save adder format can have a sum portion and a carry portion wherein the value is given by the addition of the sum portion and the doubled carry portion.

Moreover, the multiplication block can be configured to perform multiplications of parts of the sum portion of the first multiplicand with the second multiplicand and of parts of the carry portion of the first multiplicand with the second multiplicand, respectively, and to carry-save add the resulting vectors for the multiplied sum portion and the doubled result vectors for the multiplied carry portions and to further compress the so obtained sum portions and carry portions by carry-save adding operations until a multiplication output in a carry-save adder format is obtained. The summation of the partial products can be implemented by a CSA adder tree.

It can be provided that the doubled result vectors are obtained by a bit shift operation.

The output of the at least one multiplication block can be connected with a 2s complement inversion block, wherein the 2s complement inversion block is configured to forward the multiplication output in the carry-save adder format unchanged or as a 2s complement inverted multiplication output in CSA format to the carry-save adder depending on a provided sign bit.

In combination with the successive 2s complement inversion operation in CSA format based on the separate sign bit of the second multiplicand, also signed multiplications can be performed.

According to an embodiment multiple multiplication blocks can be provided whose outputs one of are fed directly and are fed via a respective 2s complement inversion block to a multiplexer, wherein an output of the multiplexer is connected to the carry-save adder.

One multiplication block can be provided having a first multiplicand input and a second multiplicand input, wherein the output of the multiplication block is connected either directly or via a respective 2s complement inversion block to one coefficient adder, wherein the output of the multiplication block and the output of the at least one coefficient adder are connected to a multiplexer, wherein an output of the multiplexer is connected to the carry-save adder.

According to an embodiment a modulo speculation unit can be provided to provide a control signal for performing a selection in the multiplexer of each of the MAC units, wherein the outputs of the adding units after the CSA-MAC unit of the last pipelining stage are each applied to a CSA-to-binary converter, each of which is connected to a selector unit, wherein the selector unit is configured to provide the control signal to the selector blocks within the CSA-MAC units in the pipelined feedback loop that then selects the valid output out of the multiple adding unit outputs whose value is within the valid transmit range and hence has no underflow or overflow in the binary format after the CSA-to-binary converters, which is equivalent to applying a modulo operation to each of the multiple CSA-to-binary converter outputs.

According to a further aspect a Tomlinson-Harashima precoder including: a number of above pipelined MAC units, wherein the outputs of the MAC units are respectively coupled to one succeeding of the number of piplined MAC units; wherein the output of the MAC unit of the last pipelining stage is coupled with the first multiplicand input of each of the number of MAC units.

Furthermore, a modulo speculation unit can be provided to provide a control signal for performing a selection in the multiplexer of each of the MAC units, wherein the outputs of the adding units located after the CSA-MAC unit of the last pipelining stage are each applied to CSA-to-binary converters, whose outputs are connected to a selector unit, wherein the selector unit is configured to provide the control signal to select the valid CSA input signal going to the CSA-to-binary converters that is within the valid transmit range, where the selection criteria is given by not having an over- or underflow in the output of the pertinent CSA-to-binary converter.

The modulo speculation unit can be provided to select one of the output of the MAC unit of the last pipelining stage and the outputs of the adding units as an output of the Tomlinson-Harashima precoder.

What is claimed is:

1. A system comprising:
    at least one multiplication block which is configured to produce a multiplication result by multiplying a first input signal and a second input signal, wherein the first input signal is given in a carry-save adder format and the second input signal is given in a binary format, wherein the multiplication result is provided in a carry-save format; and
    a carry-save adder which is configured to add the multiplication result to a provided summand.

2. The system of claim 1, wherein the carry-save adder format has a sum portion and a carry portion, wherein the value is given by a sum of the sum portion and double the carry portion.

3. The system of claim 1, wherein the output of the at least one multiplication block is connected with a 2s complement inversion block, wherein the 2s complement inversion block is configured to forward the multiplication result in the carry-save adder format unchanged or as a 2s complement inverted multiplication output in a carry-save format to the carry-save adder depending on a provided sign bit.

4. The system of claim 3, wherein the carry-save adder format has a sum portion and a carry portion wherein the value is given by a sum of the sum portion and double the carry portion.

5. The system of claim 1, wherein multiple multiplication blocks are provided each having a first input signal and a second input signal, wherein the outputs of each of the multiplication blocks one of are connected directly and are connected via a respective 2s complement inversion block to a multiplexer, wherein an output of the multiplexer is connected to the carry-save adder.

6. The system of claim 1, wherein one multiplication block is provided having a first input signal and a second input signal, wherein the output of the multiplication block one of is connected directly and is connected via a respective 2s complement inversion block to one coefficient adder, wherein the output of the multiplication block and the output of the at least one coefficient adder are connected to a multiplexer, wherein an output of the multiplexer is connected to the carry-save adder.

7. A Tomlinson-Harashima precoder comprising:
a number of multiply and accumlation (MAC) units for multiplying a provided first input signal and a provided second input signal and for adding a provided summand to the resulting product, including:
at least one multiplication block which is configured to produce a multiplication result by multiplying the first input signal and the second input signal, wherein the first input signal is given in a carry-save adder format and the second input signal is given in a binary format, wherein the multiplication result is provided in a carry-save format; and
a carry-save adder which is configured to add the multiplication result to a provided summand;
wherein multiple multiplication blocks are provided each having a first input signal and a second input signal, wherein the outputs of each of the multiplication blocks are connected directly and are connected via a respective 2s complement inversion block to a multiplexer, wherein an output of the multiplexer is connected to the carry-save adder;
wherein the MAC units are interconnected in a pipelined stage configuration such that their outputs become the summand input for the CSA-MAC unit of a next pipelining stage; and
at least one adding unit for receiving an output of the CSA-MAC unit of the last pipelining stage and for adding a predetermined value, wherein the output of the CSA-MAC unit of the last pipelining stage and the output(s) of the at least one adding unit are coupled with a respective one of the first multiplicand inputs of at least a part of CSA-MAC unit in the pipelined feedback loop.

8. The Tomlinson-Harashima precoder according to claim 7, wherein a modulo speculation unit is provided to provide a control signal for performing a selection in the multiplexer of each of the MAC units, wherein the output of the MAC unit of the last pipelining stage and the outputs of the adding units are each applied to a CSA-to-binary converter, each of which is connected to a selector unit, wherein the selector unit is configured to provide the control signal to select one of the output of the Nth MAC unit and the outputs of the adding units where no underflow or overflow occurs.

9. The Tomlinson-Harashima precoder according to claim 8, wherein a modulo speculation unit is provided to select one of the output of the MAC unit of the last pipelining stage and the outputs of the adding units as an output of the Tomlinson-Harashima precoder.

10. The Tomlinson-Harashima precoder according to claim 7, wherein the outputs of the MAC units are respectively coupled to one succeeding MAC unit of the number of pipelined MAC units, wherein the output of the MAC unit of the last pipelining stage is coupled with the first input signal of each of the number of MAC units.

11. The Tomlinson-Harashima precoder according to claim 10, wherein a modulo speculation unit is provided to provide a control signal for performing a selection in the multiplexer of each of the MAC units, wherein the output of the MAC unit of the last pipelining stage and outputs of one, two or more than two adding units are each applied to a CSA-to-binary converter, each of which is connected to a selector unit, wherein the selector unit is configured to provide the control signal to select the valid CSA input signal going to the CSA-to-binary converters that is within the valid transmit range, where the selection criteria is given by not having an over- or underflow in the output of the pertinent CSA-to-binary converter.

12. The Tomlinson-Harashima precoder according to claim 11, wherein a modulo speculation unit is provided to select one of the output of the MAC unit of the last pipelining stage and the outputs of the adding units as an output of the Tomlinson-Harashima precoder.

* * * * *